United States Patent
Kaplansky et al.

(10) Patent No.: US 10,140,148 B1
(45) Date of Patent: Nov. 27, 2018

(54) COPY BASED IOMMU EMULATION FOR OUT-OF-PROCESS EMULATED DEVICES

(71) Applicant: Red Hat Israel, Ltd., Ra'anana (IL)

(72) Inventors: Victor Kaplansky, Ra'anana (IL); Michael Tsirkin, Lexington, MA (US)

(73) Assignee: Red Hat Israel, Ltd., Ra'anana (IL)

( * ) Notice: Subject to any disclaimer, the term of this patent is extended or adjusted under 35 U.S.C. 154(b) by 0 days.

(21) Appl. No.: 15/691,244

(22) Filed: Aug. 30, 2017

(51) Int. Cl.
| | |
|---|---|
| G06F 12/00 | (2006.01) |
| G06F 9/455 | (2018.01) |
| G06F 3/06 | (2006.01) |
| G06F 12/1009 | (2016.01) |
| G06F 12/14 | (2006.01) |
| G06F 13/16 | (2006.01) |

(52) U.S. Cl.
CPC .......... *G06F 9/45558* (2013.01); *G06F 3/065* (2013.01); *G06F 3/0619* (2013.01); *G06F 3/0685* (2013.01); *G06F 12/1009* (2013.01); *G06F 12/145* (2013.01); *G06F 13/1663* (2013.01); *G06F 2009/45579* (2013.01); *G06F 2009/45583* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 8,656,386 B1 | 2/2014 | Baimetov et al. | |
| 8,938,571 B1 | 1/2015 | Vincent | |
| 9,569,233 B2 | 2/2017 | Tsirkin | |
| 2016/0062781 A1* | 3/2016 | Tsirkin | G06F 9/4843 718/1 |
| 2016/0239430 A1 | 8/2016 | Tsirkin et al. | |
| 2016/0299712 A1* | 10/2016 | Kishan | G06F 3/0619 |

OTHER PUBLICATIONS

Vmware, Inc; Understanding Memory Resource Management in VMwaree ESX™ Server, 2009; 20 pages.

* cited by examiner

*Primary Examiner* — John A Lane
(74) *Attorney, Agent, or Firm* — K&L Gates LLP

(57) ABSTRACT

A system and method for copy based IOMMU emulation for out-of-process emulated device includes a memory, one or more physical processors, a virtual machine having a guest and a guest memory, and a hypervisor executing on the physical processors. In an example, the hypervisor receives a request from the guest to grant access of a virtual device to a guest memory page when the guest memory is mapped to a private memory. The virtual device is mapped to a shared memory. The virtual device has access to the guest memory while the guest memory is mapped to the shared memory. The hypervisor copies data in a private memory page to a shared memory page in response to receiving the request. Then, the hypervisor maps the guest memory page to the shared memory page, which grants the virtual device access to the guest memory page.

20 Claims, 9 Drawing Sheets

| 210A<br>x0001 | 220A<br>Read-Only | 230A<br>x03FF |
| --- | --- | --- |
| 210B<br>x0002 | 220B<br>Read-Write | 230B<br>x040F |
| 210C<br>x0003 | 220C<br>Executable | 230C<br>x041F |
| 210D<br>x0004 | 220D<br>Executable Only | 230D<br>x042F |

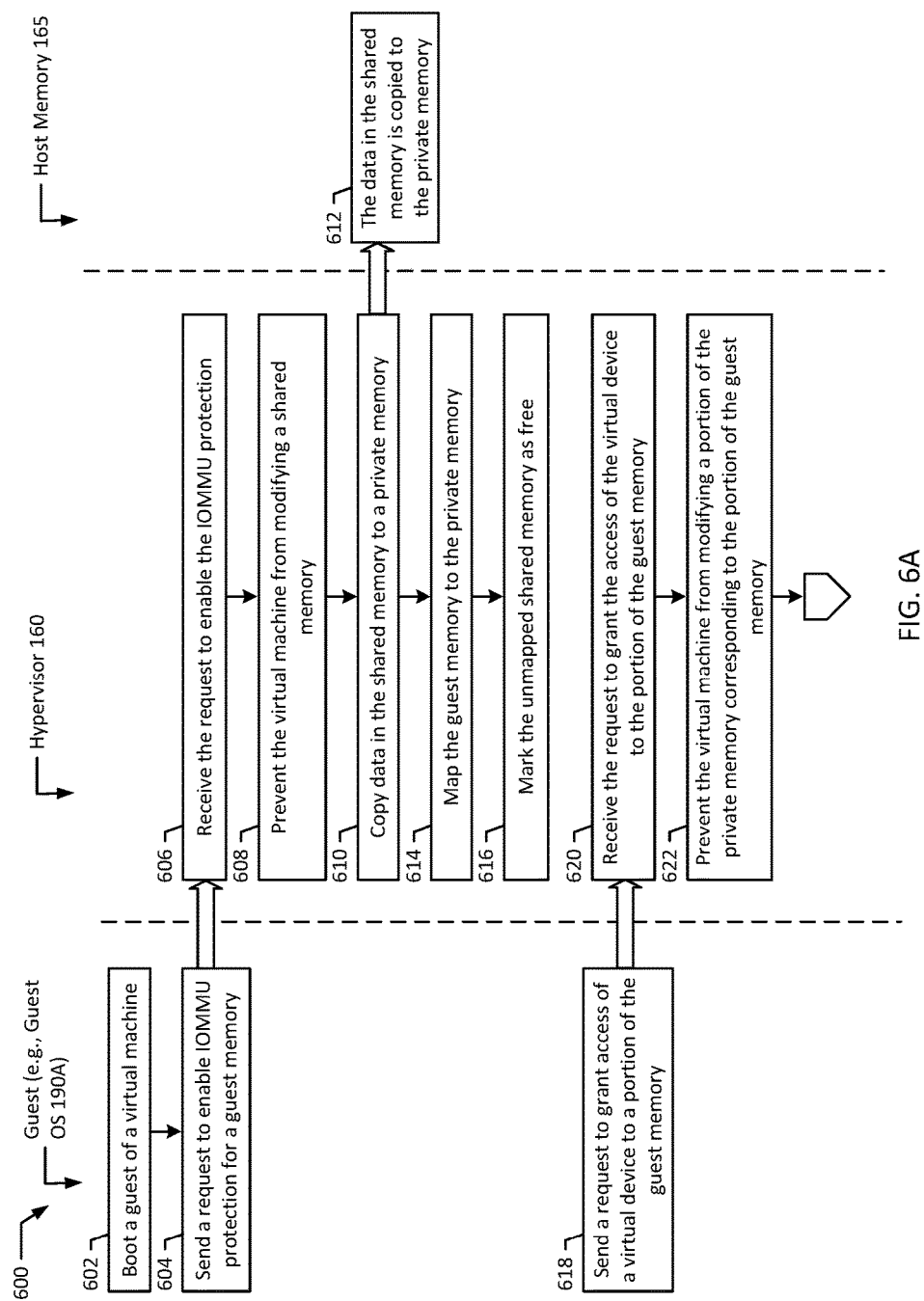

COPY BASED IOMMU EMULATION FOR OUT-OF-PROCESS EMULATED DEVICES

BACKGROUND

Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines, which may increase the hardware utilization rate.

Virtualization may be achieved by running a software layer, often referred to as a hypervisor, above the hardware and below the virtual machines. A hypervisor may run directly on the server hardware without an operating system beneath it or as an application running on a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor. An input output memory management unit (IOMMU) may also be virtualized. An emulated or virtual IOMMU may be used to limit access of specific devices (e.g., virtual devices). Using the virtual IOMMU, a guest of virtual machines may grant access to a virtual device and/or later revoke that access.

SUMMARY

The present disclosure provides a new and innovative system and methods for copy based IOMMU emulation for out-of-process emulated devices. In an example, a system includes a memory, one or more physical processors in communication with the memory, a virtual machine executing on the one or more physical processors, and a hypervisor executing on the one or more physical processors. The virtual machine includes a guest and a guest memory having a plurality of guest memory pages. The hypervisor may be configured to receive a request from the guest to grant access of a virtual device to a first guest memory page of a plurality of guest memory pages. The guest memory is mapped to a private memory having a plurality of private memory pages. The virtual device is mapped to a shared memory having a plurality of shared memory pages corresponding to the plurality of guest memory pages. The virtual device is restricted from accessing the private memory. The virtual device has access to the guest memory while the guest memory is mapped to the shared memory. Mapping the guest memory to the private memory prevents the virtual device from accessing the guest memory.

The hypervisor may be further configured to copy data in a first private memory page to a first shared memory page in response to receiving the request. The first shared memory page and the first private memory page correspond to the first guest memory page. The first private memory page is mapped to the first guest memory page. Then, the hypervisor may be configured to map the first guest memory page to the first shared memory page, which grants the virtual device access to the first guest memory page.

In another example, a system includes a memory, one or more physical processors in communication with the memory, a virtual machine executing on the one or more physical processors, and a hypervisor executing on the one or more physical processors. The virtual machine includes a guest and a guest memory. The hypervisor may be configured to receive a request from the guest to revoke access of a virtual device to a portion of the guest memory. The portion of the guest memory is mapped to a portion of a shared memory. The virtual device is mapped to the shared memory, which grants the virtual device access to the portion of the guest memory while the portion of the guest memory is mapped to the portion of the shared memory.

The hypervisor is further configured to map the portion of the guest memory to a portion of a private memory in response to receiving the request, which prevents the virtual device from accessing the portion of the guest memory. The portion of the shared memory and the portion of the private memory correspond to the portion of the guest memory.

Additional features and advantages of the disclosed method and apparatus are described in, and will be apparent from, the following Detailed Description and the Figures.

BRIEF DESCRIPTION OF THE FIGURES

FIG. 2 is a block diagram of an example host page table according to an example of the present disclosure.

FIGS. 6A and 6B are a flow diagram illustrating an example process for copy based IOMMU emulation for out-of-process emulated devices according to an example of the present disclosure.

DETAILED DESCRIPTION OF EXAMPLE EMBODIMENTS

Figure 1:
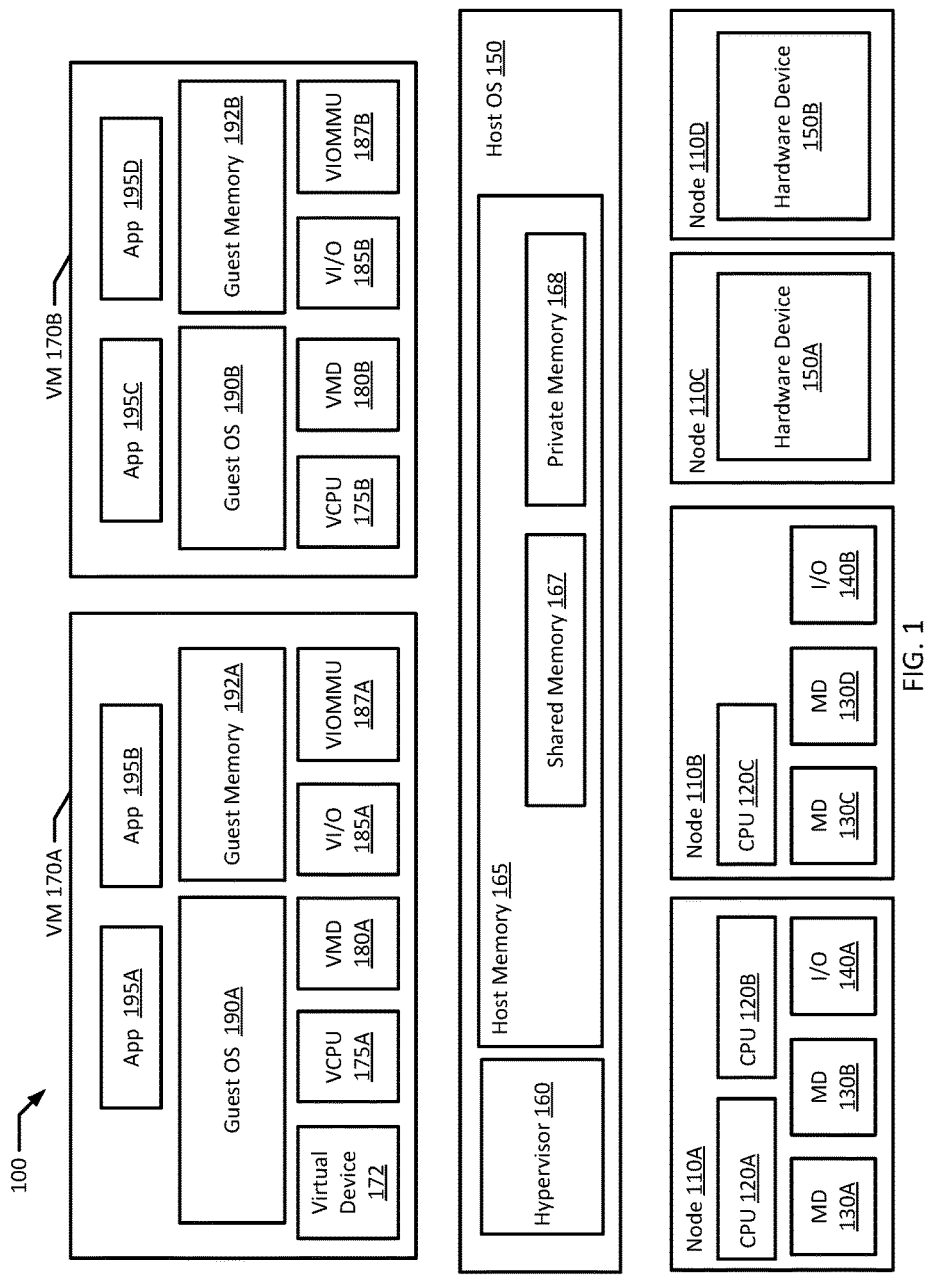
FIG. 1 is a block diagram of an example computer system according to an example of the present disclosure.

Described herein are methods and systems for copy based IOMMU emulation for out-of-process emulated devices. Generally, modern hypervisor systems include an important limitation security-wise, namely, that all parts of the hypervisor are too powerful and this may compromise the security of the guest. As some of the parts of the hypervisor have to interact with an outside system through a network, the security issues are clear. On physical systems, an input output memory management unit (IOMMU) may be used to protect the system from a physical device, but a similar use of an emulated or virtual IOMMU by a hypervisor may be futile for the hypervisor since the IOMMU emulation is part of the hypervisor system. While the process implementing a virtual device consults the virtual IOMMU before accesses, a buggy implementation of a virtual device may still be able to access all of the guest memory.

One way to address this issue may be to change the mapping of the virtual device by simply removing the pages of the guest memory, for which the virtual device should be restricted from accessing, from a page table (e.g., device page table) for a process that implements the virtual device. Whenever the guest requests a change of the mapping of the virtual device, the hypervisor may change the mapping of the virtual device by removing the pages from the device page table. In this way, the virtual device may be prevented from accessing the pages removed from the page table for the virtual device process. However, this would be very difficult and ineffective to implement for the following reasons.

First, some standard programming language, such as C language, may typically not expect a memory page (that was being used by a virtual device) to disappear, which may cause a system crash and there may be no crash recovery mechanism for this type of crash. Second, this may be too complex to implement since many operating systems, such as the Linux® operating systems, may lack application program interfaces (APIs).

Third, changing the mapping of the virtual device may cause interruptions of other processors, which may be very computationally expensive. For example, if a guest sends a request to a hypervisor to prevent a virtual device from accessing a page of a guest memory, the processor that was running the guest may be switched to run the hypervisor while the virtual device may be running on another processor at that time. In order to change the mapping of the virtual device, the hypervisor may need to communicate this change of mapping with the processor that is running the virtual device, but the hypervisor may not know on which processor the virtual device is currently running. Since the processor on which the virtual device is running can be changed dynamically, finding this processor may not only be very difficult, but also be very computationally expensive to implement. Even if the hypervisor finds the processor on which the virtual device is currently running, the hypervisor may also need to communicate this change of mapping with all the other processors that executed the virtual device in the past so that these other processors can remove the old page table cached in each processor. All these communications with other processors may interrupt the functionality of these processors (e.g., stopping the processors) and these interruptions may not be computationally affordable, particularly for a system with demanding workloads.

Another approach may be bounce buffer technology which is used by some guests. A bounce buffer is a memory location to which the guest may copy data that the guest wants to be accessible by a virtual device. Therefore, the guest may copy data that the guest wants to share with the virtual device to the bounce buffer and no data that should not be accessed by the virtual device would be copied to the bounce buffer. So, this bounce buffer technology can be implemented only under the perception of the guest. That is, the guest should understand that the guest is using the bounce buffer technology and/or copies data to the bounce buffer so that the data can be accessible by the virtual device. However, some modern guests may refuse to use this bounce buffer technology since this implementation may be expensive to those guests. In some cases, some modern guests may not know how to use this technology and in order to force these guests to use the bounce buffer technology, the configuration of the guest may need to be changed.

Aspects of the present disclosure may address the above-noted deficiencies. For example, the system may have two copies of parts of the guest memory: a shared memory and a private memory. The virtual device may be mapped to the shared memory so that the virtual device can access the guest memory while the guest memory is mapped to the shared memory. On the other hand, the private memory is not accessible by the virtual device. When the guest memory is mapped to the private memory, the virtual device may then be restricted from accessing the guest memory. The hypervisor may include a device page table that manages the mapping of the virtual device.

When a guest requests that a portion of the guest memory is made accessible to the virtual device, data in a corresponding portion of the private memory may be copied to a portion of the shared memory and then the portion of the guest memory may be mapped into the portion of the shared memory. When the guest requests a portion of the guest memory is made in-accessible to the virtual device, the data may be copied in the reverse direction and the portion of the guest memory may be mapped to the portion of the private memory. In an example, the copying steps may be implemented only at a set up time (e.g., when a Data Plane Development Kit (DPDK) process starts with the guest) to reduce the number of interruptions in the system.

From the guest's perspective, there may be a single guest memory, while there are two memories (shared memory and private memory) from the hypervisor's perspective. From the guest's perspective, the guest creates a virtual IOMMU (VIOMMU) interface and a page table (e.g., VIOMMU page table), which is under the guest's control, to manage the mapping of the virtual device. When the guest wants to change the mapping of the virtual device, the guest may change this page table. In an example, when this page table is changed by the guest, a request is sent to the hypervisor to change the mapping of the virtual device.

From the hypervisor's perspective, when the hypervisor receives a request from the guest to change the mapping of the virtual device, instead of changing the mapping of the virtual device by changing the device page table, the hypervisor changes the mapping of the guest memory between the shared memory and the private memory, for example, by changing the host page table. Therefore, while it may appear that the mapping of the virtual device is changed from the guest's perspective, the mapping of the virtual device is actually not changed to allow or disallow the virtual device's access to part or all of the guest memory, and the virtual device may continue being mapped to the shared memory. The changes of the guest memory mapping may require the guest to be stopped, but this may not be an issue because these changes happen rarely, for example, on guest boot or software update within the guest. Since the change of the mapping of the guest memory does not require an interruption to the processors in the system, this may advantageously enable the system to reduce the number of interruptions in the system significantly, contributing for more efficient implementation of the processors while providing a more secure hypervisor system. Also, unlike the bounce buffer technology, the process in some aspects of the present disclosure happens in the hypervisor behind the perception of the guest. Advantageously, there is no concern about any guests' refusal to utilize the presently disclosed process. Some aspects of the present disclosure may also make the existing guest more secure without any changes to the configuration of the guests. Additional features and advantages of the disclosed method, system, and apparatus are described below.

FIG. 1 depicts a high-level component diagram of an example multi-processor computer system 100 in accordance with one or more aspects of the present disclosure. The computer system 100 may include one or more interconnected nodes 110A-D. Each node 110A-B may in turn include one or more physical processors (e.g., CPU 120A-C)

communicatively coupled to memory (e.g., memory 130A-D) and input/output devices (e.g., I/O 140A-B). Each node 110C-D may include a hardware device 150A-B. In an example embodiment, a hardware device (e.g., 150A-B) may include a network device (e.g., a network interface controller (NIC), a network adapter or any other component that connects a computer to a computer network), a peripheral component interconnect (PCI) device, IOMMU, storage devices, disk drives, sound or video adaptors, photo/video cameras, printer devices, keyboards, displays, etc.

As used herein, physical processor or processor 120A-C refers to a device capable of executing instructions encoding arithmetic, logical, and/or I/O operations. In one illustrative example, a processor may follow the Von Neumann architectural model and may include an arithmetic logic unit (ALU), a control unit, and a plurality of registers. In a further aspect, a processor may be a single core processor that is typically capable of executing one instruction at a time (or processing a single pipeline of instructions), or a multi-core processor that may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence, share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data. The memory device 130A-D may be divided into units referred to as pages. A page is a specific amount of contiguous memory that generally represents the smallest unit in which an operating system allocates for various purposes. A page of memory is a set range of addresses to which data can be stored. The operating system may swap pages from working memory to longer term storage such as a non-volatile storage.

Processors 120A-C may be interconnected using a variety of techniques, ranging from a point-to-point processor interconnect, to a system area network, such as an Ethernet-based network. Local connections within each node, including the connections between a processor 120A-B and a memory device 130A-B and between a processor 120A-B and an I/O device 140A, may be provided by one or more local buses of suitable architecture, for example, peripheral component interconnect (PCI). As used herein, a device of the OS 150, which may be referred to as a host device, may refer to CPU 120A-C, Memory 130A-D, I/O 140A-B, a software device, and/or a hardware device.

The computer system 100 may run multiple virtual machines (e.g., VM 170A-B) by executing a software layer (e.g., hypervisor 160) above the hardware and below the virtual machines, as schematically shown in FIG. 1. The virtual machines (e.g., VM 170A-B) may be an interface to a guest of the virtual machines and may be executing on the hypervisor 160. In an example, the hypervisor 160 may be a component of the host operating system 150 executed by the computer system 100. In another example, the hypervisor 160 may be provided by an application running on the operating system 150, or may run directly on the computer system 100 without an operating system beneath it. The hypervisor 160 may virtualize the physical layer, including processors, memory, and I/O devices, and present this virtualization to virtual machines 170A-B as devices, including virtual processors (e.g., VCPU 175A-B), virtual memory (e.g., VMD 180A-B), and/or virtual I/O devices (e.g., VI/O 185A-B). Processor virtualization may be implemented by the hypervisor 160 scheduling time slots on one or more physical processors 120A-C such that from the guest operating system's perspective, those time slots are scheduled on a virtual processor 175A-B. In an example, the virtual processors 175A-B may have access to all of the memory, including guest memory 192A-B and host memory 165. The hypervisor 160 is provided with some memory referred to as host memory 165. Host memory 165 may correspond to physical pages in memory 130A-D. Thus, a subset of the pages in memory 130A-D may be specifically allocated for use by the hypervisor 160. The hypervisor 160 can use this memory to perform various tasks related to management of the virtual machines 170A-B.

The host memory 165 may include a shared memory 167 and a private memory 168. In another example, the shared memory 167 and the private memory 168 may be located outside the host memory 165, for example, in a storage device. In an example, a virtual device 172 may be mapped to a part or the entire portion of the shared memory 167 all the time and the mapping of the virtual device may not be changed. In another example, the mapping of the virtual device 172 may be changed, but it may be much less frequent than the frequency with which guest memory mapping changes. In an example, the private memory 168 may be accessible by the guest, but the virtual device 172 may be restricted from accessing the private memory 168. In an example, the virtual device 172 may be a virtualized device of the host machine (e.g., a network interface device, a CD-ROM drive, etc.).

In an example, a virtual machine 170A-B may execute a respective guest operating system 190A-B, which may utilize the respective underlying VCPU 175A-B, VMD 180A-B, and VI/O devices 185A-B. One or more applications 195A-D may be running on a virtual machine 170A-B under the guest operating system 190A-B. In an example, a virtual machine 170A may include a virtual device 172. For example, the virtual device 172 may be virtualized or emulated by the hypervisor 160. In an example, the virtual device 172 may be part of the hypervisor 160 (e.g., module of the hypervisor 160) but, unlike the hypervisor 160, the virtual device 172 may not have access to the entire guest memory 192A all the time. For example, a process of the virtual device 172 may be separate from a process of the hypervisor 160 (i.e., out-of-process) and may have a page table separate from the process of the hypervisor 160. In Linux® systems, for example, a process is distinguishable from a thread in that with processes a page table is created for each process while multiple threads use one page table. The virtual device process may have a memory context separate from the hypervisor process. The virtual device 172 may be an independent component separate from the virtual processors 175A-B or virtual memories 180A-B. In an example, a virtual machine 170A-B may also include a guest memory 192A-B. Guest memory 192A-B may include one or more guest memory pages.

A virtual machine 170A-B may also include a virtual input output memory management unit (VIOMMU) 187A-B that is used to limit access of specific devices. Using the VIOMMU 187A-B, a guest of virtual machines 170A-B may grant access to a virtual device 172 and/or later revoke that access. For example, if a virtual device 172 needs to write into a guest memory 192A, the VIOMMU 187A may be programmed to grant write access to the virtual device 172. After the virtual device 172 writes into the guest memory 192A, the VIOMMU 187A may revoke the write access. This may be managed through a VIOMMU page table. For example, the VIOMMU page table may include information about the mapping of the virtual device 172. The VIOMMU page table may be stored in the guest memory 192A-B.

FIG. 2 illustrates a host page table 200 according to an example embodiment of the present disclosure. In general, the hypervisor 160 manages the memory usage of the VMs 170A-B. Both virtual memory and physical memory may be divided into pages, which are identified with a unique number (e.g., Page Frame Number (PFN) 210A-D).

A host page table 200 is a data structure used by the hypervisor 160 to store a mapping of memory addresses of the guest OS 190A-B to memory addresses of the host OS 150. Accordingly, address translation is handled using page tables 200.

The host page table 200 includes entries that map PFN 210A-D (e.g., a memory address of the guest OS 190A-B, which is a guest memory 192A-B) with an address 230A-D (e.g., a memory address of the host OS 150, which is a host memory 165). Page tables 200 may be used together with any paging data structure used by the VMs 170A-B to support translation from guest OS 190A-B to host OS 150 addresses (e.g., 32-bit linear address space using a two-level hierarchical paging structure, Physical Address Extension mode, INTEL Extended Memory 64 Technology mode, etc.).

In an example embodiment, a page table 200 may include protection identifiers 220A-D that indicate an access status for each of the pages. The protection identifier 220A-D indicates the access status of a page corresponding to the page entry of the page table 200. For example, a protection identifier 220A-D may be used to define that a given page is writable (or read-write), write-protected (or read-only), executable (or executable and readable), executable only, etc. For example, as illustrated in the example embodiment in FIG. 2, the page corresponding to PFN 210A address (x0001), address 230A (x03FF), and protection identifier 220A has been defined in page table 200 as 'Read-Only. The hypervisor 160 may be used to modify a protection identifier 220A-D of various pages. In addition, in an example embodiment, the page table 200 may include additional information not shown in FIG. 2 including statistics information, background information, dirty identifiers which indicate that modifications to a page must be written back to disk, etc.

In an example embodiment, one or more page tables 200 may be maintained by the hypervisor 160 which map guest OS 190A-B addresses to host OS 150 addresses that are accessible by the hypervisor 160, VMs 170A-B, guest OS 190A-B, host OS 150, and/or host OS 150 resources. The sizes of different page tables may vary and may include more or fewer entries than are illustrated in FIG. 2.

Figure 3A:
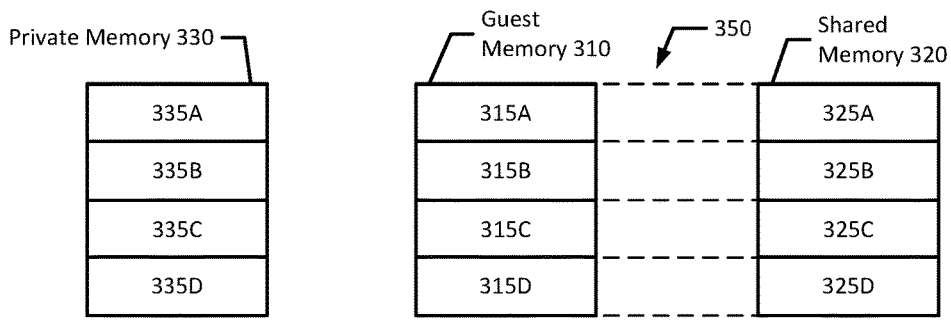
FIGS. 3A, 3B, and 3C are block diagrams of example guest, shared, and private memories according to an example of the present disclosure
Figure 3B:
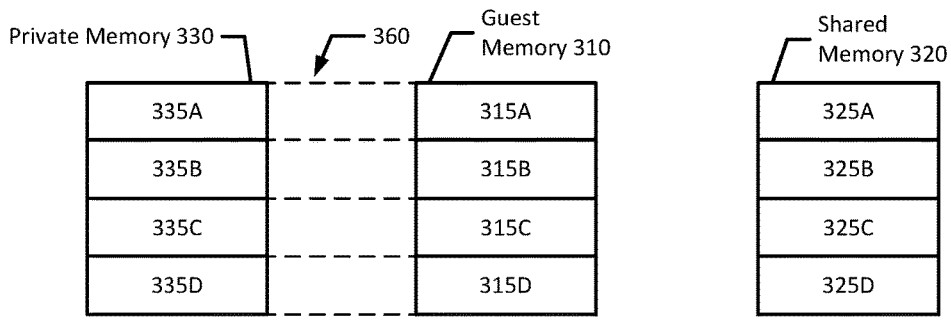
Figure 3C:
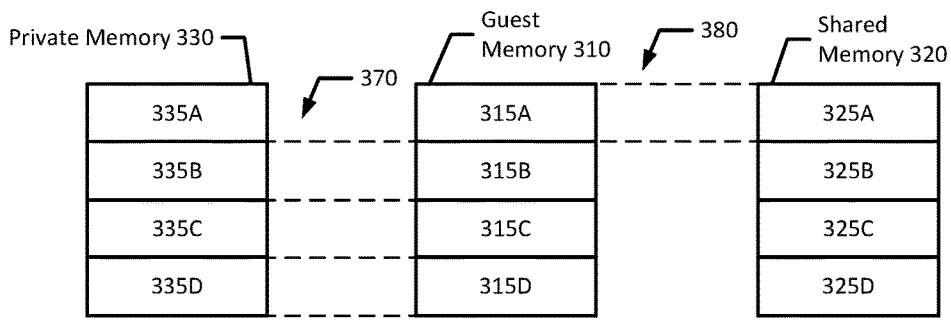

FIGS. 3A, 3B, and 3C are block diagrams of example guest, shared, and private memories, illustrating a change of a mapping of a guest memory 310 between a shared memory 320 and a private memory 330. The guest memory 310 may include a plurality of guest memory pages 315A-D. The shared memory 320 may include a plurality of shared memory pages 325A-D corresponding to the plurality of guest memory pages 315A-D. For example, the shared memory page 325A may correspond to the guest memory page 315A and the shared memory page 325B may correspond to the guest memory page 315B. Similarly, the private memory 330 may include a plurality of private memory pages 335A-D corresponding to the plurality of guest memory pages 315A-D.

As illustrated in FIG. 3A, in an example, all of the guest memory pages 315A-D may be mapped 350 to the shared memory pages 325A-D. For example, the guest memory page 315A is mapped to the shared memory page 325A and the guest memory page 315B is mapped to the shared memory page 325B. In an example, the virtual device 172 may have access to the guest memory 310 while the guest memory 310 is mapped to the shared memory 320. For example, if the virtual device 172 is mapped to the shared memory pages 325A and 325B, the virtual device 172 has access to the guest memory pages 315A and 315B while the guest memory pages 315A and 315B are mapped to the shared memory pages 325A and 325B.

As illustrated in FIG. 3B, in an example, all of the guest memory pages 315A-D may be mapped 360 to the private memory 330. As discussed above, the virtual device 172 may be restricted from accessing the private memory 330. The virtual device 172 may have no access to the guest memory 310 while the guest memory 310 is mapped to the private memory 330. For example, if the guest memory page 315A is mapped to the private memory page 335A, the virtual device 172 may not have access to the guest memory page 315A.

As illustrated in FIG. 3C, in an example, a portion of the guest memory 310 (e.g., guest memory page 315A) may be mapped 380 to a portion of the shared memory 320 (e.g., shared memory page 325A) and other portions of the guest memory 310 (e.g., guest memory pages 315B-D) may be mapped 370 to a portion of the private memory 330 (private memory pages 335B-D). In this example, if the virtual device 172 is mapped to the shared memory pages 325A and 325B, the virtual device 172 may have access to the guest memory page 315A, but may not have access to the guest memory page 315B.

Figure 4:
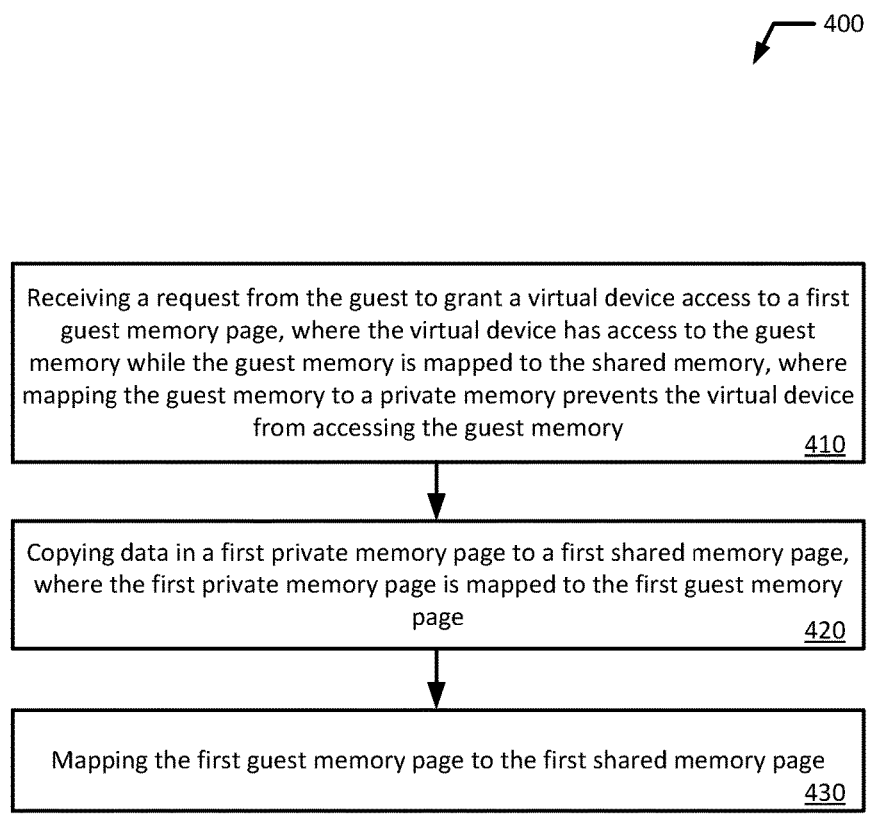
FIG. 4 is a flowchart illustrating an example process for copy based IOMMU emulation for out-of-process emulated devices according to an example of the present disclosure.

FIG. 4 shows a flowchart illustrating an example process 400 for copy based IOMMU emulation for out-of-process emulated devices. Although the example method 400 is described with reference to the flowchart illustrated in FIG. 4, it will be appreciated that many other methods of performing the acts associated with the method may be used. For example, the order of some of the blocks may be changed, certain blocks may be combined with other blocks, and some of the blocks described are optional.

In the illustrated example, a hypervisor may receive a request from the guest to grant a virtual device access to a first guest memory page, where the virtual device has access to the guest memory while the guest memory is mapped to the shared memory, where mapping the guest memory to a private memory prevents the virtual device from accessing the guest memory (block 410). For example, a hypervisor 160 may receive a request from the guest to grant a virtual device 172 access to a first guest memory page 315A. For example, the guest memory 310 may be mapped to the private memory 330 having a plurality of private memory pages 335A-D, and the virtual device 172 may be mapped to the shared memory 320 having a plurality of shared memory pages 325A-D corresponding to a plurality of guest memory pages 315A-D. In an example, the virtual device 172 has access to the guest memory 310 while the guest memory 310 is mapped to the shared memory 320, and mapping the guest memory 310 to a private memory 330 prevents the virtual device 172 from accessing the guest memory 310. The guest memory 310 may include the plurality of guest memory pages 315A-D. In an example, when the hypervisor 160 received the request from the guest to grant the access of the virtual device 172 to the first guest memory page 315A, the guest memory 310 may be being mapped to the private memory 330 and the virtual device 172 may be being mapped to the shared memory 320. The virtual device 172 may be restricted from accessing the private memory 330. As used herein, a guest may refer to any software running within the virtual machines (e.g., VM 170A-B), such as guest operating systems (e.g., guest OS 190A-B) and/or applications running on the guest operating systems (e.g., Applications 195A-D), and/or may refer to guest firmware running within the virtual machines (e.g., VM 170A-B). In an example, the hypervisor may copy data in a first private memory page to a first shared memory page, where the first private memory page is mapped to the first guest memory page (block 420). For example, in response to receiving the request, the hypervisor 160 may copy data in a first private memory page 335A to a first shared memory page 325A.

The first shared memory page 325A and the first private memory page 335A may correspond to the first guest memory page 315A. The first private memory page 335A may be mapped to the first guest memory page 315A. That is, when the hypervisor 160 copies the data from the first private memory page 335A to the first shared memory page 325A, the first private memory page 335A may be being mapped to the first guest memory page 315A.

Then, the hypervisor may map the first guest memory page to the first shared memory page (block 430). For example, the hypervisor 160 may map the first guest memory page 315A to the first shared memory page 325A, which grants the virtual device 172 access to the first guest memory page 315A. When the first guest memory page 315A is mapped to the first shared memory page 325A, the first guest memory page 315A may be unmapped from the first private memory page 335A.

Figure 5:
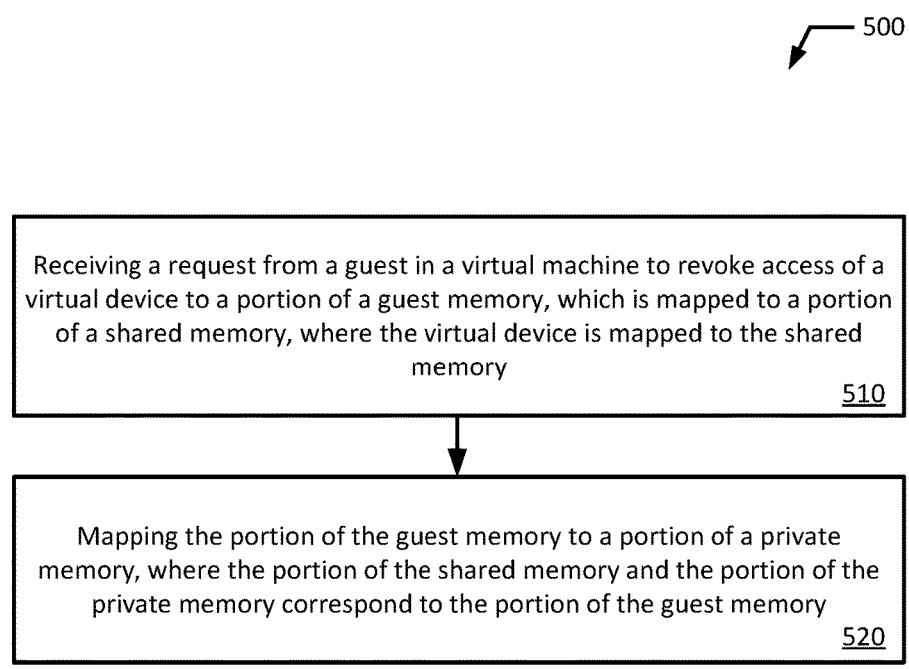
FIG. 5 is a flowchart illustrating an example process for copy based IOMMU emulation for out-of-process emulated devices according to another example of the present disclosure.

FIG. 5 shows a flowchart illustrating another example process 500 for copy based IOMMU emulation for out-of-process emulated devices. Although the example method 500 is described with reference to the flowchart illustrated in FIG. 5, it will be appreciated that many other methods of performing the acts associated with the method may be used. For example, the order of some of the blocks may be changed, certain blocks may be combined with other blocks, and some of the blocks described are optional.

In the illustrated example, a hypervisor may receive a request from a guest in a virtual machine to revoke access of a virtual device to a portion of a guest memory, which is mapped to a portion of a shared memory, where the virtual device is mapped to the shared memory (block 510). For example, the hypervisor 160 receives a request from a guest in a virtual machine 170A to revoke access of a virtual device 172 to a portion 315A of a guest memory 310. The guest memory 310 is mapped to a portion 325A of a shared memory 320, and the virtual device 172 is mapped to the shared memory 320. The virtual device 172 may have access to the portion 315A of the guest memory 310 while the portion 315A of the guest memory 310 is mapped to the portion 325A of the shared memory 320.

Then, the hypervisor may map the portion of the guest memory to a portion of a private memory, where the portion of the shared memory and the portion of the private memory correspond to the portion of the guest memory (block 520). For example, in response to receiving the request to revoke the access of the virtual device 172 to the portion 315A of the guest memory 310, the hypervisor 160 may map the portion 315A of the guest memory 310 to a portion 335A of a private memory 330. The portion 325A of the shared memory 320 and the portion 335A of the private memory 330 may correspond to the portion 315A of the guest memory 310. Mapping the portion 315A of the guest memory 310 to the portion 335A of the private memory 330 may prevent the virtual device 172 from accessing the portion 315A of the guest memory 310. In an example, when the portion 315A of the guest memory 310 is mapped to the portion 335A of the private memory 330, the portion 315A of the guest memory 310 may be unmapped from the portion 325A of the shared memory 320.

In an example, a host memory 165 may store a host page table 200 that includes information about a mapping of the guest memory 310. The hypervisor 160 may change the information in the host page table 200 when changing the mapping of the guest memory 310 between the shared memory 320 and the private memory 330. For example, PFN 210A (x0001) is an address of the guest memory page 315A and it is mapped to an address (x03FF) of the shared memory page 325A at 230A. When the guest memory page 315A is unmapped from the shared memory page 325A and mapped to the private memory page 335A, the address at 230A may be changed from the address (x03FF) of the shared memory page 325A to an address (e.g., x01AF) of the private memory page 335A.

Figure 6B:
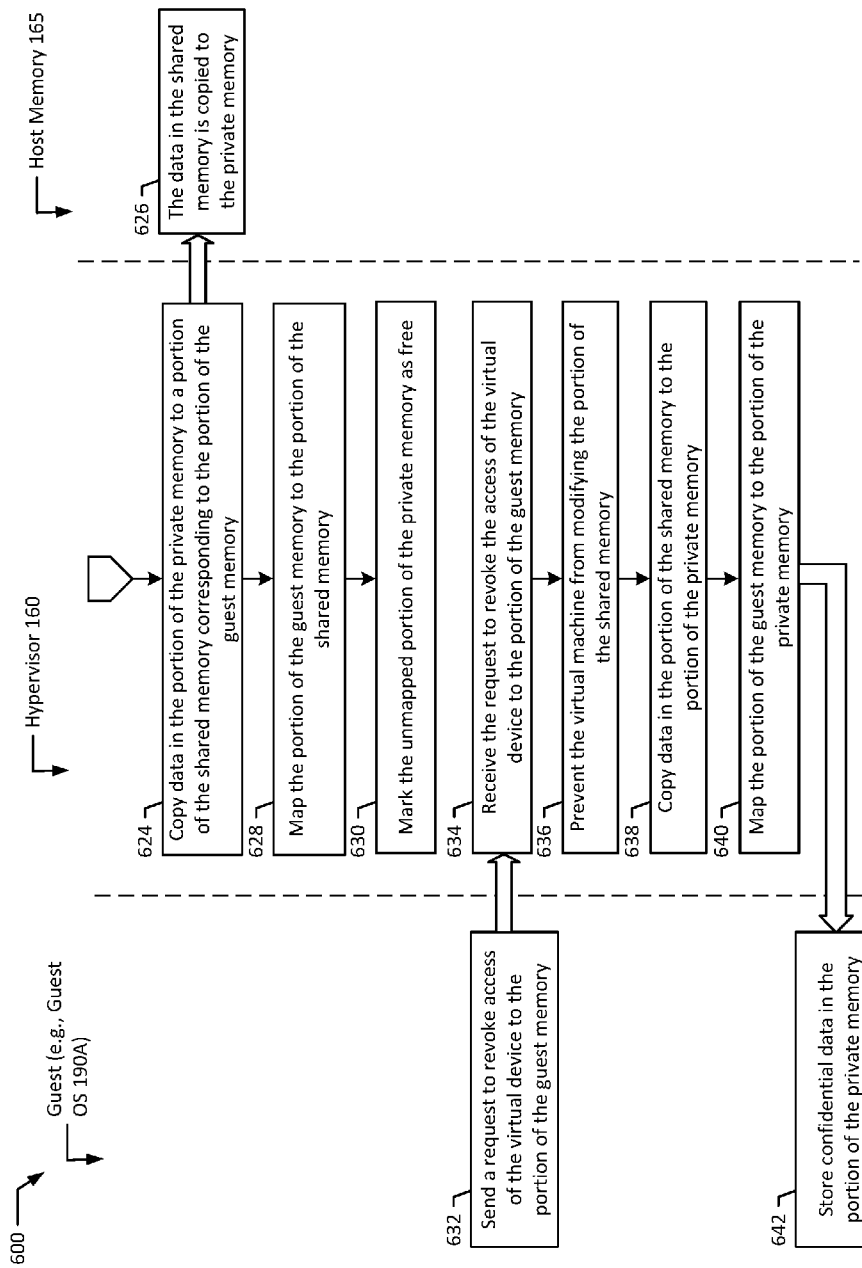

FIGS. 6A and 6B illustrate a flow diagram of an example method 600 for copy based IOMMU emulation for out-of-process emulated devices according to an example of the present disclosure. Although the example method 600 is described with reference to the flow diagram illustrated in FIGS. 6A and 6B, it will be appreciated that many other methods of performing the acts associated with the method may be used. For example, the order of some of the blocks may be changed, certain blocks may be combined with other blocks, and some of the blocks described are optional. The method 600 may be performed by processing logic that may include hardware (circuitry, dedicated logic, etc.), software, or a combination of both. For example, the method 600 may be performed by a system including hypervisor 160, a guest (e.g., Guest OS 190A), and host memory 165 communicating or interacting with each other.

In the illustrated example, a guest of a virtual machine 170A may be booted (block 602). In an example, a guest memory 310 may be mapped to a shared memory 320 when the guest is booted by default. For example, in some processors, such as Intel® processors, when a guest is initialized, the system may be in a permissible mode and IOMMU protection may be also disabled. Then, the guest may send a request to enable IOMMU protection for a guest memory 310 (block 604). In an example, the IOMMU protection may include VIOMMU protection. In an example, the request may be a request from guest OS 190A to prevent a virtual device 172 from accessing the guest memory 310. The hypervisor 160 may receive the request to enable the IOMMU protection (block 606).

In an example, the virtual device 172 may be mapped to the shared memory 320, which grants the virtual device 172 access to the guest memory 310 while the guest memory 310 is mapped to the shared memory 320. That is, the virtual device 172 has access to the guest memory 310 while the guest memory 310 is mapped to the shared memory 320. However, when the guest memory 310 is mapped to the private memory 330, the virtual device 172 is prevented from accessing the guest memory 310. The virtual device 172 is also restricted from accessing the private memory 330. The virtual device 172 may be mapped to the shared memory 320 using a device page table that manages a mapping of the virtual device 172. For example, the device page table may include information about the mapping of the virtual device 172 to the shared memory 320. The device page table may also include information that the virtual device 172 has no access (e.g., reading/writing) to the private memory 330.

In response to receiving the request to enable the IOMMU protection, the hypervisor 160 may prevent the virtual machine 170A from modifying the shared memory 320 (block 608). Then, the hypervisor 160 may copy data in the shared memory 320 to a private memory 330 (blocks 610 & 612). The hypervisor 160 may also map the guest memory 310 to the private memory 330 (block 614). That is, when there is a request from the guest to enable the IOMMU protection, instead of changing the mapping of the virtual device 172 by changing the device page table, the hypervisor 160 changes the mapping of the guest memory 310, for example, by modifying the host page table 200. If there are multiple VCPUs in the virtual machine 170A, the multiple VCPUs may have access to the shared memory 320 and may be able to change the data in the shared memory 320. This may cause a data inconsistency because the data in the shared memory 320 can be changed between the copying step and the mapping step. For example, if the data in the shared memory 320 is modified after the copying step but before the mapping step, the data in the private memory 330 and the data in the shared memory 320 may become different. Preventing the virtual machine 170A (and multiple VCPUs in the virtual machine 170A) from modifying the shared memory 320 before the copying and mapping step may address this issue to maintain data consistency.

In an example, the hypervisor 160 may prevent the virtual machine 170A from modifying the shared memory 320 by stopping the virtual machine 170A (and the VCPUs in the virtual machine 170) while copying the data in the shared memory 320 to the private memory 330 and/or mapping the guest memory 310 to the private memory 330. In another example, the hypervisor 160 may prevent the virtual machine 170A from modifying the shared memory 320 by write-protecting the data in the shared memory (e.g., by changing the protection identifiers for the shared memory pages, which are in a host page table 200, to "Read-Only") while copying the data in the shared memory 320 to the private memory 330 and/or mapping the guest memory 310 to the private memory 330.

When the guest memory 310 is mapped to the private memory 330, the guest memory 310 may be unmapped from the shared memory 320, which may prevent the virtual device 172 from accessing the guest memory 310. In an example, the hypervisor 160 may notify the virtual device 172 that the virtual device 172 is restricted from accessing the guest memory 310 after the guest memory 310 is mapped to the private memory 330 and/or unmapped from the shared memory 320.

From the guest's perspective, the mapping of the virtual device, for example, in the IOMMU (or VIOMMU) page table may be changed to prevent the virtual device 172 from accessing the guest memory 310. However, from the hypervisor's perspective, the mapping of the virtual device, for example, in the device page table may not be changed, but the mapping of the guest memory 310, for example, in the host page table 200 may be changed from the shared memory 320 to the private memory 330 to prevent the virtual device 172 from accessing the guest memory 310.

In an example, the hypervisor 160 may mark the unmapped shared memory 320 as free so that the unmapped shared memory 320 can be used by other virtual machines 170B or hypervisor 160 (block 616). For example, the hypervisor 160 may mark the unmapped shared memory 320 as free by invoking a madvise call (e.g., MADV_FREE). Accordingly, this may advantageously reduce memory overhead in the system.

At a later time, the guest may send a request to grant access of a virtual device 172 to a portion 315A of the guest memory 310 (blocks 618 & 620). For example, the guest OS 190A may send such a request when the portion 315A of the guest memory 310 includes a packet to which the guest OS 190A wants the virtual device 172 to have access. Then, the hypervisor 160 may prevent the virtual machine 170A from modifying a portion 335A of the private memory 330 corresponding to the portion 315A of the guest memory 310 (block 622). Then, the hypervisor 160 may copy data in the portion 335A of the private memory 330 to a portion 325A of the shared memory 320 corresponding to the portion 315A of the guest memory 310 (blocks 624 & 626). The hypervisor 160 may also map the portion 315A of the guest memory 310 to the portion 325A of the shared memory 320 (block 628). That is, when there is a request from the guest to grant access of the virtual device 172 to a portion of the guest memory 310, instead of changing the mapping of the virtual device 172 by modifying the device page table, the hypervisor 160 may change the mapping of the portion 315A of the guest memory 310, for example, by modifying the host page table 200.

When the portion 315A of the guest memory 310 is mapped to the portion 325A of the shared memory 320, the portion 315A of the guest memory 310 may be unmapped from the portion 335A of the private memory 330. Then, the hypervisor 160 may mark the unmapped portion 335A of the private memory 330 as free so that the unmapped portion 335A can be used by other virtual machines 170B or hypervisor 160 (block 630). For example, the hypervisor 160 may mark the unmapped portion 335A of the private memory 330 as free by invoking the madvise call (e.g., MADV_FREE).

From the guest's perspective, the mapping of the virtual device 172, for example, in the IOMMU (or VIOMMU) page table may be changed to allow the virtual device 172 to access the portion 315A of the guest memory 310. However, from the hypervisor's perspective, the mapping of the virtual device 172, for example, in the device page table may not be changed to grant the virtual device 172 the access to the portion 315A of the guest memory 310. Instead, the mapping of the guest memory 310, for example, in the host page table 200 may be changed from the portion 335A of the private memory 330 to the portion 325A of the shared memory 320.

At a later time, the guest may send a request to revoke access of the virtual device 172 to the portion 315A of the guest memory 310 (blocks 632 & 634). For example, the guest may send such a request after the packet stored in the portion 315A of the guest memory 310 has been processed and transmitted by the virtual device 172. Then, the hypervisor 160 may prevent the virtual machine 170A from modifying the portion 325A of the shared memory 320 (block 636). Then, the hypervisor 160 may copy data in the portion 325A of the shared memory 320 to the portion 335A of the private memory 330 (block 638). The hypervisor 160 may also map the portion 315A of the guest memory 310 to the portion 335A of the private memory 330 (block 640). That is, when there is a request from the guest to revoke the access of the virtual device 172 to the portion 315A of the guest memory 310, instead of changing the mapping of the virtual device 172 by modifying the device page table, the hypervisor 160 may change the mapping of the portion 315A of the guest memory 310, for example, by modifying the host page table 200.

From the guest's perspective, the mapping of the virtual device 172, for example, in the IOMMU (or VIOMMU) page table may be changed to disallow the virtual device 172 from accessing the portion 315A of the guest memory 310. However, from the hypervisor's perspective, the mapping of the virtual device 172, for example, in the device page table may not be changed to revoke the virtual device 172's access to the portion 315A of the guest memory 310. Instead, the mapping of the guest memory 310, for example, in the host page table 200 may be changed from the portion 325A of the shared memory 320 to the portion 335A of the private memory 330.

When the portion 315A of the guest memory 310 is mapped to the portion 335A of the private memory 330, the portion 315A of the guest memory 310 may be unmapped from the portion 325A of the shared memory 320. In an example, the hypervisor 160 may notify the virtual device 172 that the virtual device is restricted from accessing the portion 315A of the guest memory 310 after the portion 315A of the guest memory 310 is mapped to the portion 335A of the private memory 330 or unmapped from the portion 325A of the shared memory 320. In an example, the guest may store confidential data (e.g., personal information) in the portion 335A of the private memory 330 (block 642). For example, after the portion 315A of the guest memory 310 is mapped to the portion 335A of the private memory 330 and/or unmapped from the portion 325A of the shared memory 320, the guest OS 190A stores the personal financial information in the portion 335A of the private memory 330.

After the hypervisor 160 unmaps the portion 315A of the guest memory 310 from the portion 325A of the shared memory 330 and maps the portion 315A of the guest memory 310 to the portion 335A of the private memory 330, when the guest attempts to access the portion 315A of the guest memory 310, the guest may be landed into the portion 335A of the private memory 330 instead of the portion 325A of the shared memory 320. However, when the virtual device 172 attempts to access the portion 315A of the guest memory 310, the virtual device 172 may be landed into the portion 325A of the shared memory 320. In this case, the virtual device 172 may access the stale data in the portion 325A of the shared memory 320.

As discussed above, the hypervisor 160 may prevent the virtual machine 170A from modifying the shared memory 320 or the private memory 330 before changing a mapping of the guest memory 310. In another example, the hypervisor 160 may allow the virtual machine 170A to modify the shared memory 320 or the private memory 330 while changing the mapping of the guest memory 310. In an example, the hypervisor 160 may change the mapping of the guest memory 310 between the shared memory 320 and the private memory 330 during a guest setup time.

In an example, the guest may send the requests to change the mapping of the virtual device 172 to the hypervisor 160 when switching processes (e.g., processing and moving packets between multiple virtual devices) within the guest starts executing using a user space driver. In an example, the mapping steps at blocks 614, 628, and 640 may be performed without the copying of blocks 610, 624, and 638.

Figure 7:
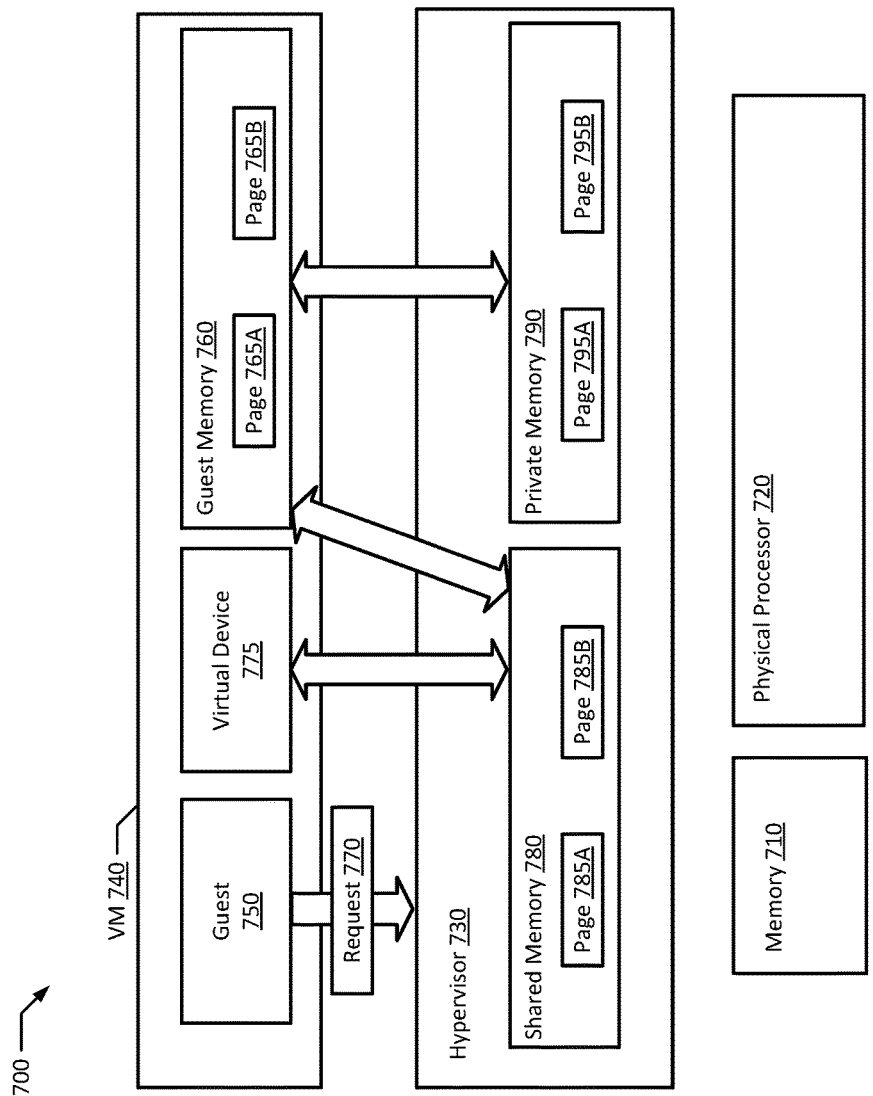
FIG. 7 is a block diagram of an example computer system according to an example of the present disclosure.

FIG. 7 shows a block diagram of an example system according to an example of the present disclosure. As illustrated in FIG. 7, an example system 700 includes a memory 710, a physical processor 720 in communication with the memory 710, a virtual machine 740 executing on the physical processor 720, and a hypervisor 730 executing on the physical processor 720. The virtual machine 740 includes a guest 750 and a guest memory 760 having a plurality of guest memory pages 765A-B. The hypervisor 730 may be configured to receive a request 770 from the guest 750 to grant access of a virtual device 775 to a first guest memory page 765A of a plurality of guest memory pages 765A-B. The guest memory 760 is mapped to a private memory 790 having a plurality of private memory pages 795A-B. The virtual device 775 is mapped to a shared memory 780 having a plurality of shared memory pages 785A-B corresponding to the plurality of guest memory pages 765A-B. The virtual device 775 is restricted from accessing the private memory 790. The virtual device 775 has access to the guest memory 760 while the guest memory 760 is mapped to the shared memory 780. Mapping the guest memory 760 to the private memory 790 prevents the virtual device 775 from accessing the guest memory 760.

The hypervisor 730 may be further configured to copy data in a first private memory page 795A to a first shared memory page 785A in response to receiving the request 770. The first shared memory page 785A and the first private memory page 795A correspond to the first guest memory page 765A. At this time, the first private memory page 795A is mapped to the first guest memory page 765A. Then, the hypervisor 730 may be configured to map the first guest memory page 765A to the first shared memory page 785A, which grants the virtual device 765A access to the first guest memory page 765A.

Figure 8:
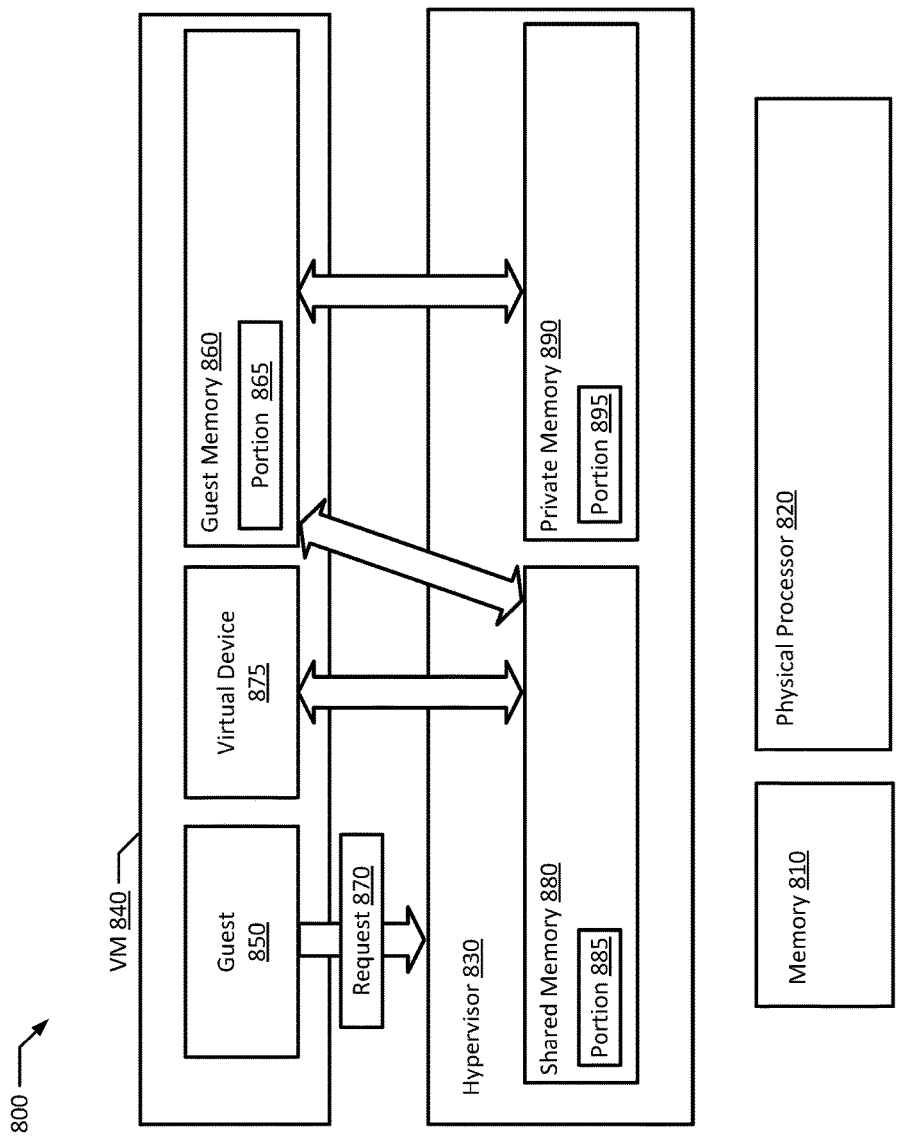
FIG. 8 is a block diagram of another example computer system according to an example of the present disclosure.

FIG. 8 shows a block diagram of an example system according to an example of the present disclosure. As illustrated in FIG. 8, an example system 800 includes a memory 810, a physical processor 820 in communication with the memory 810, a virtual machine 840 executing on the physical processor 820, and a hypervisor 830 executing on the physical processor 820. The virtual machine 840 includes a guest 850 and a guest memory 860. The hypervisor 830 may be configured to receive a request 870 from the guest 850 to revoke access of a virtual device 875 to a portion 865 of the guest memory 860. The portion 865 of the guest memory 860 is mapped to a portion 885 of a shared memory 880. The virtual device 875 is mapped to the shared memory 880, which grants the virtual device 875 access to the portion 865 of the guest memory 860 while the portion 865 of the guest memory 860 is mapped to the portion 885 of the shared memory 880.

The hypervisor 830 is further configured to map the portion 865 of the guest memory 860 to a portion 895 of a private memory 890 in response to receiving the request 870, which prevents the virtual device 875 from accessing the portion 865 of the guest memory 860. The portion 885 of the shared memory 880 and the portion 895 of the private memory 890 correspond to the portion 865 of the guest memory 860.

Accordingly, the presently disclosed system may perform copy based IOMMU emulation for out-of-process emulated virtual devices by changing the mapping of the guest memory between the shared memory and the private memory when there is a request from the guest to change the mapping of the virtual device, which may advantageously reduce the number of processor interrupts, resulting in more efficient implementation of the processors while providing a more secure hypervisor system.

Other computer system designs and configurations may also be suitable to implement the systems and methods described herein. The following examples illustrate various implementations in accordance with one or more aspects of the present disclosure.

Aspects of the subject matter described herein may be useful alone or in combination with one or more other aspects described herein. In a 1st exemplary aspect of the present disclosure, a method comprises: receiving, by a hypervisor, a request from a guest in a virtual machine to grant access of a virtual device to a first guest memory page of a plurality of guest memory pages, wherein the plurality of guest memory pages are included in a guest memory that is mapped to a private memory having a plurality of private memory pages, wherein the virtual device is mapped to a shared memory having a plurality of shared memory pages corresponding to the plurality of guest memory pages, wherein the virtual device is restricted from accessing the private memory, wherein the virtual device has access to the guest memory while the guest memory is mapped to the shared memory, wherein mapping the guest memory to the private memory prevents the virtual device from accessing the guest memory; in response to receiving the request, copying, by the hypervisor, data in a first private memory page of the plurality of private memory pages to a first shared memory page of the plurality of the shared memory pages, wherein the first shared memory page and the first private memory page correspond to the first guest memory page, wherein the first private memory page is mapped to the first guest memory page; and mapping, by the hypervisor, the first guest memory page to the first shared memory page, which grants the virtual device access to the first guest memory page.

In accordance with a 2nd exemplary aspect of the present disclosure, which may be used in combination with any one or more of the preceding aspects (e.g., the 1st aspect), wherein the virtual device is mapped to the shared memory using a device page table that manages a mapping of the virtual device.

In accordance with a 3rd exemplary aspect of the present disclosure, which may be used in combination with any one or more of the preceding aspects (e.g., the 1st aspect), wherein a mapping of the virtual device is not changed to grant the virtual device the access to the first guest memory page.

In accordance with a 4th exemplary aspect of the present disclosure, which may be used in combination with any one or more of the preceding aspects (e.g., the 1st aspect), wherein a host memory stores a host page table that includes information about a mapping of the guest memory and the hypervisor changes the information in the host page table when changing the mapping of the guest memory between the shared memory and the private memory.

In accordance with a 5th exemplary aspect of the present disclosure, which may be used in combination with any one or more of the preceding aspects (e.g., the 1st aspect), further comprising: receiving, by the hypervisor, a request from the guest to enable Input/Output Memory Management Unit (IOMMU) protection for the guest memory when the guest memory is mapped to the shared memory; in response to receiving the request to enable the IOMMU protection, copying, by the hypervisor, data in the shared memory to the private memory; and mapping, by the hypervisor, the guest memory to the private memory.

In accordance with a 6th exemplary aspect of the present disclosure, which may be used in combination with any one or more of the preceding aspects (e.g., the 5th aspect), wherein the hypervisor prevents the virtual machine from modifying the shared memory before copying the data in the shared memory to the private memory and before mapping the guest memory to the private memory.

In accordance with a 7th exemplary aspect of the present disclosure, which may be used in combination with any one or more of the preceding aspects (e.g., the 6th aspect), wherein the hypervisor prevents the virtual machine from modifying the shared memory by stopping the virtual machine while copying the data in the shared memory to the private memory and mapping the guest memory to the private memory.

In accordance with an 8th exemplary aspect of the present disclosure, which may be used in combination with any one or more of the preceding aspects (e.g., the 5th aspect), wherein the hypervisor marks the unmapped shared memory as free after the guest memory is mapped to the private memory.

In accordance with a 9th exemplary aspect of the present disclosure, which may be used in combination with any one or more of the preceding aspects (e.g., the 8th aspect), wherein the hypervisor marks the unmapped shared memory as free by invoking a madvise call.

In accordance with a 10th exemplary aspect of the present disclosure, which may be used in combination with any one or more of the preceding aspects (e.g., the 1st aspect), wherein the hypervisor changes the mapping of the guest memory between the shared memory and the private memory during a guest setup time.

In accordance with an 11th exemplary aspect of the present disclosure, which may be used in combination with any one or more of the preceding aspects (e.g., the 1st aspect), wherein the hypervisor prevents the virtual machine from modifying the first private memory page before copying the data in the first private memory page to the first shared memory page and before mapping the first guest memory page to the first shared memory page.

Aspects of the subject matter described herein may be useful alone or in combination with one or more other aspects described herein. In a 12th exemplary aspect of the present disclosure, a non-transitory machine readable medium storing instructions, which when executed by one or more physical processors, cause the one or more physical processors to: receive a request from a guest in a virtual machine to grant access of a virtual device to a first guest memory page of a plurality of guest memory pages, wherein the plurality of guest memory pages are included in a guest memory that is mapped to a private memory having a plurality of private memory pages, wherein the virtual device is mapped to a shared memory having a plurality of shared memory pages corresponding to the plurality of guest memory pages, wherein the virtual device is restricted from accessing the private memory, wherein the virtual device has access to the guest memory while the guest memory is mapped to the shared memory, wherein mapping the guest memory to the private memory prevents the virtual device from accessing the guest memory; in response to receiving the request, copy data in a first private memory page of the plurality of private memory pages to a first shared memory page of the plurality of the shared memory pages, wherein the first shared memory page and the first private memory page correspond to the first guest memory page, wherein the first private memory page is mapped to the first guest memory page; and map the first guest memory page to the first shared memory page, which grants the virtual device access to the first guest memory page.

Aspects of the subject matter described herein may be useful alone or in combination with one or more other aspects described herein. In a 13th exemplary aspect of the present disclosure, a system comprises: a means for receiving a request from a guest in a virtual machine to grant access of a virtual device to a first guest memory page of a plurality of guest memory pages, wherein the plurality of guest memory pages are included in a guest memory that is mapped to a private memory having a plurality of private memory pages, wherein the virtual device is mapped to a shared memory having a plurality of shared memory pages corresponding to the plurality of guest memory pages, wherein the virtual device is restricted from accessing the private memory, wherein the virtual device has access to the guest memory while the guest memory is mapped to the shared memory, wherein mapping the guest memory to the private memory prevents the virtual device from accessing the guest memory; a means for copying data in a first private memory page of the plurality of private memory pages to a first shared memory page of the plurality of the shared memory pages in response to receiving the request, wherein the first shared memory page and the first private memory page correspond to the first guest memory page, wherein the first private memory page is mapped to the first guest memory page; and a means for mapping the first guest memory page to the first shared memory page, which grants the virtual device access to the first guest memory page.

Aspects of the subject matter described herein may be useful alone or in combination with one or more other aspects described herein. In a 14th exemplary aspect of the present disclosure, a method comprises: receiving, by a hypervisor, a request from a guest in a virtual machine to revoke access of a virtual device to a portion of a guest memory, wherein the portion of the guest memory is mapped to a portion of a shared memory, wherein the virtual device is mapped to the shared memory, which grants the virtual device access to the portion of the guest memory while the portion of the guest memory is mapped to the portion of the shared memory; and in response to receiving the request, mapping, by the hypervisor, the portion of the guest memory to a portion of a private memory, which prevents the virtual device from accessing the portion of the guest memory, wherein the portion of the shared memory and the portion of the private memory correspond to the portion of the guest memory.

In accordance with a 15th exemplary aspect of the present disclosure, which may be used in combination with any one or more of the preceding aspects (e.g., the 14th aspect), wherein the hypervisor copies data in the portion of the shared memory to the portion of the private memory in response to receiving the request to revoke the access of the virtual device to the portion of the guest memory.

In accordance with a 16th exemplary aspect of the present disclosure, which may be used in combination with any one or more of the preceding aspects (e.g., the 14th aspect), wherein the guest stores confidential data in the portion of the private memory after the portion of the private memory is mapped to the portion of the guest memory.

In accordance with a 17th exemplary aspect of the present disclosure, which may be used in combination with any one or more of the preceding aspects (e.g., the 14th aspect), wherein the virtual device is mapped to the shared memory using a device page table that manages a mapping of the virtual device.

In accordance with an 18th exemplary aspect of the present disclosure, which may be used in combination with any one or more of the preceding aspects (e.g., the 14th aspect), wherein the hypervisor notifies the virtual device that the virtual device is restricted from accessing the portion of the guest memory after the portion of the guest memory is mapped to the portion of the private memory.

Aspects of the subject matter described herein may be useful alone or in combination with one or more other aspects described herein. In a 19th exemplary aspect of the present disclosure, a system comprises: a memory; one or more physical processors in communication with the memory; a virtual machine executing on the one or more physical processors, wherein the virtual machine includes a guest and a guest memory having a plurality of guest memory pages; and a hypervisor executing on the one or more physical processors to: receive a request from the guest to grant access of a virtual device to a first guest memory page of a plurality of guest memory pages, wherein the guest memory is mapped to a private memory having a plurality of private memory pages, wherein the virtual device is mapped to a shared memory having a plurality of shared memory pages corresponding to the plurality of guest memory pages, wherein the virtual device is restricted from accessing the private memory, wherein the virtual device has access to the guest memory while the guest memory is mapped to the shared memory, wherein mapping the guest memory to the private memory prevents the virtual device from accessing the guest memory; in response to receiving the request, copy data in a first private memory page of the plurality of private memory pages to a first shared memory page of the plurality of the shared memory pages, wherein the first shared memory page and the first private memory page correspond to the first guest memory page, wherein the first private memory page is mapped to the first guest memory page; and map the first guest memory page to the first shared memory page, which grants the virtual device access to the first guest memory page.

In accordance with a 20th exemplary aspect of the present disclosure, which may be used in combination with any one or more of the preceding aspects (e.g., the 19th aspect), wherein the virtual device is mapped to the shared memory using a device page table that manages a mapping of the virtual device.

In accordance with a 21st exemplary aspect of the present disclosure, which may be used in combination with any one or more of the preceding aspects (e.g., the 20th aspect), wherein a mapping of the virtual device is not changed to grant the virtual device the access to the first guest memory page.

In accordance with a 22nd exemplary aspect of the present disclosure, which may be used in combination with any one or more of the preceding aspects (e.g., the 21st aspect), wherein a host memory stores a host page table that includes information about a mapping of the guest memory and the hypervisor changes the information when changing the mapping of the guest memory between the shared memory and the private memory.

In accordance with a 23rd exemplary aspect of the present disclosure, which may be used in combination with any one or more of the preceding aspects (e.g., the 19th aspect), wherein the hypervisor is configured to: receive a request from the guest to enable Input/Output Memory Management Unit (IOMMU) protection for the guest memory when the guest memory is mapped to the shared memory; in response to receiving the request to enable the IOMMU protection, copy data in the shared memory to the private memory; and map the guest memory to the private memory.

In accordance with a 24th exemplary aspect of the present disclosure, which may be used in combination with any one or more of the preceding aspects (e.g., the 23rd aspect), wherein the hypervisor prevents the virtual machine from modifying the shared memory before copying the data in the shared memory to the private memory and before mapping the guest memory to the private memory.

In accordance with a 25th exemplary aspect of the present disclosure, which may be used in combination with any one or more of the preceding aspects (e.g., the 24th aspect), wherein the hypervisor prevents the virtual machine from modifying the shared memory by stopping the virtual machine while copying the data in the shared memory to the private memory and mapping the guest memory to the private memory.

In accordance with a 26th exemplary aspect of the present disclosure, which may be used in combination with any one or more of the preceding aspects (e.g., the 23rd aspect), wherein the hypervisor marks the unmapped shared memory as free after the guest memory is mapped to the private memory.

In accordance with a 27th exemplary aspect of the present disclosure, which may be used in combination with any one or more of the preceding aspects (e.g., the 19th aspect), wherein the hypervisor changes the mapping of the guest memory between the shared memory and the private memory during a guest setup time.

In accordance with a 28th exemplary aspect of the present disclosure, which may be used in combination with any one or more of the preceding aspects (e.g., the 19th aspect), wherein the hypervisor prevents the virtual machine from modifying the first private memory page before copying the data in the first private memory page to the first shared memory page and before mapping the first guest memory page to the first shared memory page.

Aspects of the subject matter described herein may be useful alone or in combination with one or more other aspects described herein. In a 29th exemplary aspect of the present disclosure, a method comprises: receiving, by a hypervisor, a first request from a guest in a virtual machine to prevent a virtual device from accessing a guest memory, wherein the guest memory is mapped to a shared memory, wherein the virtual device is mapped to the shared memory, which grants the virtual device access to the guest memory while the guest memory is mapped to the shared memory; in response to receiving the first request, mapping, by the hypervisor, the guest memory to a private memory, which prevents the virtual device from accessing the guest memory; receiving, by the hypervisor, a second request from the guest to grant access of the virtual device to a portion of the guest memory; and in response to receiving the second request, mapping, by the hypervisor, the portion of the guest memory to a portion of the shared memory, which grants the virtual device access to the portion of the guest memory, wherein the portion of the shared memory corresponds to the portion of the guest memory.

In accordance with a 30th exemplary aspect of the present disclosure, which may be used in combination with any one or more of the preceding aspects (e.g., the 29th aspect), wherein the hypervisor copies data in a portion of the private memory to the portion of the shared memory in response to receiving the second request, wherein the portion of the private memory corresponds to the portion of the guest memory.

In accordance with a 31st exemplary aspect of the present disclosure, which may be used in combination with any one or more of the preceding aspects (e.g., the 29th aspect), wherein the virtual device is mapped to the shared memory using a device page table that manages a mapping of the virtual device.

In accordance with a 32nd exemplary aspect of the present disclosure, which may be used in combination with any one or more of the preceding aspects (e.g., the 29th aspect), wherein a host memory stores a host page table that includes information about a mapping of the guest memory and the hypervisor changes the information when changing the mapping of the guest memory.

In accordance with a 33rd exemplary aspect of the present disclosure, which may be used in combination with any one or more of the preceding aspects (e.g., the 29th aspect), wherein the hypervisor prevents the virtual machine from modifying the shared memory or the private memory before changing a mapping of the guest memory.

In accordance with a 34th exemplary aspect of the present disclosure, which may be used in combination with any one or more of the preceding aspects (e.g., the 29th aspect), wherein the hypervisor notifies the virtual device that the virtual device is restricted from accessing the guest memory after the guest memory is mapped to the private memory.

Aspects of the subject matter described herein may be useful alone or in combination with one or more other aspects described herein. In a 35th exemplary aspect of the present disclosure, a system comprises: a memory; one or more physical processors in communication with the memory; a virtual machine executing on the one or more physical processors, wherein the virtual machine includes a guest and a guest memory; and a hypervisor executing on the one or more physical processors to: receive a request from the guest to revoke access of a virtual device to a portion of the guest memory, wherein the portion of the guest memory is mapped to a portion of a shared memory, wherein the virtual device is mapped to the shared memory, which grants the virtual device access to the portion of the guest memory while the portion of the guest memory is mapped to the portion of the shared memory; and in response to receiving the request, map the portion of the guest memory to a portion of a private memory, which prevents the virtual device from accessing the portion of the guest memory, wherein the portion of the shared memory and the portion of the private memory correspond to the portion of the guest memory.

In accordance with a 36th exemplary aspect of the present disclosure, which may be used in combination with any one or more of the preceding aspects (e.g., the 35th aspect), wherein the hypervisor copies data in the portion of the shared memory to the portion of the private memory in response to receiving the request to revoke the access of the virtual device to the portion of the guest memory.

In accordance with a 37th exemplary aspect of the present disclosure, which may be used in combination with any one or more of the preceding aspects (e.g., the 35th aspect), wherein the guest stores confidential data in the portion of the private memory after the portion of the private memory is mapped to the portion of the guest memory.

In accordance with a 38th exemplary aspect of the present disclosure, which may be used in combination with any one or more of the preceding aspects (e.g., the 35th aspect), wherein the virtual device is mapped to the shared memory using a device page table that manages a mapping of the virtual device.

In accordance with a 39th exemplary aspect of the present disclosure, which may be used in combination with any one or more of the preceding aspects (e.g., the 35th aspect), wherein the hypervisor notifies the virtual device that the virtual device is restricted from accessing the portion of the guest memory after the portion of the guest memory is mapped to the portion of the private memory.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which, when executing the series of computer instructions, performs or facilitates the performance of all or part of the disclosed methods and procedures.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer-readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;
one or more physical processors in communication with the memory;
a virtual machine executing on the one or more physical processors, wherein the virtual machine includes a guest and a guest memory having a plurality of guest memory pages; and
a hypervisor executing on the one or more physical processors to:
receive a request from the guest to grant access of a virtual device to a first guest memory page of a plurality of guest memory pages, wherein the guest memory is mapped to a private memory having a plurality of private memory pages, wherein the virtual device is mapped to a shared memory having a plurality of shared memory pages corresponding to the plurality of guest memory pages, wherein the virtual device is restricted from accessing the private memory, wherein the virtual device has access to the guest memory while the guest memory is mapped to the shared memory, wherein mapping the guest memory to the private memory prevents the virtual device from accessing the guest memory;
in response to receiving the request, copy data in a first private memory page of the plurality of private memory pages to a first shared memory page of the plurality of the shared memory pages, wherein the first shared memory page and the first private memory page correspond to the first guest memory page, wherein the first private memory page is mapped to the first guest memory page; and
map the first guest memory page to the first shared memory page, which grants the virtual device access to the first guest memory page.

2. The system of claim 1, wherein the virtual device is mapped to the shared memory using a device page table that manages a mapping of the virtual device.

3. The system of claim 2, wherein a mapping of the virtual device is not changed to grant the virtual device the access to the first guest memory page.

4. The system of claim 3, wherein a host memory stores a host page table that includes information about a mapping of the guest memory and the hypervisor changes the information when changing the mapping of the guest memory between the shared memory and the private memory.

5. The system of claim 1, wherein the hypervisor is configured to:
receive a request from the guest to enable Input/Output Memory Management Unit (IOMMU) protection for the guest memory when the guest memory is mapped to the shared memory;
in response to receiving the request to enable the IOMMU protection, copy data in the shared memory to the private memory; and
map the guest memory to the private memory.

6. The system of claim 5, wherein the hypervisor prevents the virtual machine from modifying the shared memory before copying the data in the shared memory to the private memory and before mapping the guest memory to the private memory.

7. The system of claim 6, wherein the hypervisor prevents the virtual machine from modifying the shared memory by stopping the virtual machine while copying the data in the shared memory to the private memory and mapping the guest memory to the private memory.

8. The system of claim 5, wherein the hypervisor marks the unmapped shared memory as free after the guest memory is mapped to the private memory.

9. The system of claim 1, wherein the hypervisor changes the mapping of the guest memory between the shared memory and the private memory during a guest setup time.

10. The system of claim 1, wherein the hypervisor prevents the virtual machine from modifying the first private memory page before copying the data in the first private memory page to the first shared memory page and before mapping the first guest memory page to the first shared memory page.

11. A method comprising:
receiving, by a hypervisor, a first request from a guest in a virtual machine to prevent a virtual device from accessing a guest memory, wherein the guest memory is mapped to a shared memory, wherein the virtual device is mapped to the shared memory, which grants the virtual device access to the guest memory while the guest memory is mapped to the shared memory;

in response to receiving the first request, mapping, by the hypervisor, the guest memory to a private memory, which prevents the virtual device from accessing the guest memory;

receiving, by the hypervisor, a second request from the guest to grant access of the virtual device to a portion of the guest memory; and in response to receiving the second request, mapping, by the hypervisor, the portion of the guest memory to a portion of the shared memory, which grants the virtual device access to the portion of the guest memory, wherein the portion of the shared memory corresponds to the portion of the guest memory.

12. The method of claim 11, wherein the hypervisor copies data in a portion of the private memory to the portion of the shared memory in response to receiving the second request, wherein the portion of the private memory corresponds to the portion of the guest memory.

13. The method of claim 11, wherein the virtual device is mapped to the shared memory using a device page table that manages a mapping of the virtual device.

14. The method of claim 11, wherein a host memory stores a host page table that includes information about a mapping of the guest memory and the hypervisor changes the information when changing the mapping of the guest memory.

15. The method of claim 11, wherein the hypervisor prevents the virtual machine from modifying the shared memory or the private memory before changing a mapping of the guest memory.

16. The method of claim 11, wherein the hypervisor notifies the virtual device that the virtual device is restricted from accessing the guest memory after the guest memory is mapped to the private memory.

17. A system comprising:
a memory;
one or more physical processors in communication with the memory;
a virtual machine executing on the one or more physical processors, wherein the virtual machine includes a guest and a guest memory; and
a hypervisor executing on the one or more physical processors to:
receive a request from the guest to revoke access of a virtual device to a portion of the guest memory, wherein the portion of the guest memory is mapped to a portion of a shared memory, wherein the virtual device is mapped to the shared memory, which grants the virtual device access to the portion of the guest memory while the portion of the guest memory is mapped to the portion of the shared memory; and
in response to receiving the request, map the portion of the guest memory to a portion of a private memory, which prevents the virtual device from accessing the portion of the guest memory, wherein the portion of the shared memory and the portion of the private memory correspond to the portion of the guest memory.

18. The system of claim 17, wherein the hypervisor copies data in the portion of the shared memory to the portion of the private memory in response to receiving the request to revoke the access of the virtual device to the portion of the guest memory.

19. The system of claim 17, wherein the guest stores confidential data in the portion of the private memory after the portion of the private memory is mapped to the portion of the guest memory.

20. The system of claim 17, wherein the virtual device is mapped to the shared memory using a device page table that manages a mapping of the virtual device.

* * * * *